United States Patent [19]
Bermender

[11] 3,718,094
[45] Feb. 27, 1973

[54] GAS GENERATOR CHARGE WITH DECREASED TEMPERATURE SENSITIVITY

[75] Inventor: Norman W. Bermender, Waco, Tex.

[73] Assignee: North American Aviation, Inc.

[22] Filed: July 30, 1962

[21] Appl. No.: 214,449

[52] U.S. Cl. ................. 102/101, 60/39.47, 60/254
[51] Int. Cl. ............................................. F42b 1/00
[58] Field of Search ..... 60/35.6, 35.4, 39.47; 149/14, 149/15, 16; 102/49, 98, 100, 101

[56] References Cited

UNITED STATES PATENTS

| | | |
|---|---|---|
| 3,136,122 | 6/1964 | McJones ................ 102/98 X |
| 3,143,853 | 8/1964 | Sobey ..................... 60/35.6 |
| 2,681,619 | 6/1954 | Chandler ................. 60/225 |

*Primary Examiner*—Samuel Feinberg
*Attorney*—William R. Lane, Thomas S. MacDonald and Stuart W. Wohlgemuth

EXEMPLARY CLAIM

1. A gas generator charge comprising:

a first cylindrical solid propellant grain having disposed concentrically therein a second less temperature sensitive solid propellant strand, wherein said second propellant strand is smaller than said first grain so as not to materially contribute to the gas production of the propellant as whole.

1 Claim, 7 Drawing Figures

FIG. I

*INVENTOR.*
NORMAN W. BERMENDER
BY
*Stuart W. Wohlgemuth*
AGENT

GAS GENERATOR CHARGE WITH DECREASED TEMPERATURE SENSITIVITY

This invention concerns a novel solid propellant rocket motor. More specifically, the invention pertains to a solid propellant rocket motor having reduced temperature sensitivity.

The use of a solid rocket motor as a gas generator for rocket applications is well known. A gas generator is an assembly that will generate hot gas under pressure, for example, for supplying power to any component or accessory of a rocket power plant. Typically, the gas generator is used mainly for driving the turbine of a turbo-pump assembly, pressurizing propellant tanks, driving the turbine of an accessory power supply or various other auxiliary power requirements in a rocket engine system. The hot pressurized gases delivered by the gas generator are a result of burning an internally-contained solid mixture of an oxidizer and a fuel. The typical design of a solid generator comprises a combustion chamber which contains a solid reactant charge made up of a solid mixture of a fuel and an oxidizer with probably other additives such as an inhibitor mixed therein. Additionally, there is included a means for igniting this solid reactant charge and there is a discharge outlet from the generator for attachment to the system which is to use the hot gases.

In operation the solid propellant charge is ignited by the flame of a squib igniter which is usually electrically excited. The charge burns thus generating hot gases at very high pressure. These gases are emitted from the generator to an outlet into the system which utilizes this energy. The hot gases that are generated are not a pure medium in that they usually contain tiny particles of unburned propellant and residue of the combustion.

In gas generator applications it is particularly desirable and usually necessary that the solid propellant formation utilized be relatively cool-burning, that is, have a relatively low flame temperature. This can readily be appreciated in view of the fact that the hot exhaust gases come into contact with metal parts of turbines and the like. Because of this requirement, it is preferable that the propellant formulation used be basically of a propellant such as ammonium nitrate, which has the desirable flame temperatures as well as velocity characteristics for such an application. However, when utilizing a cooler-burning propellant such as ammonium nitrate, a problem arises with regard to the temperature sensitivity of the propellant. The temperature sensitivity is the sensitivity of a propellant to a change in the ambient temperature which in turn results in an effect on the energy released as well as the physical properties of the charge. The equilibrium temperature of a solid propellant grain has a measurable effect on the burning rate and other properties obtained during the firing of the charge. The initial temperature of the grain will also materially affect its performance. For example, on a hot day a given solid propellant rocket will operate at a higher chamber pressure and thrust than on a cool day. The firing duration will be shorter but the total impulse will not be changed significantly. This indicates that the initial temperature of the grain has a deciding effect on the burning rate and that weather conditions have to be considered when exacting performance requirements are to be met. The temperature sensitivity for different solid propellants is usually expressed in percent per unit of temperature change. Ordinarily the temperature sensitivity has values ranging from 0.000 to 0.30 percent/° F.

Since the initial temperature of storage affects the performance of the rocket propellant grain especially as to burning rates and the amount of thrust produced for a given duration of time, it is particularly desirable to be able to make the propellant insensitive to the storage temperature so that the propellant will burn at a given rate and chamber pressure regardless of temperature storage or in the case of rocket motors the temperature of firing. Thus, dependable performance can be achieved at varying temperature conditions.

It is an object of this invention to effectively decrease the temperature sensitivity of solid propellants.

It is a further object of this invention to provide a gas generator which is relatively temperature insensitive.

Another object of this invention is to control the effective chamber pressure of a gas generator.

This invention accomplishes the above results in providing a less temperature sensitive propellant by utilizing a propellant grain configuration wherein the burning surface of the grain can be altered during burning by the use of a control strand of propellant. The propellant configuration of this invention comprises a thin strand of control propellant situated concentrically within the main gas-producing propellant. The control strand of propellant is normally a less temperature sensitive propellant than the main charge propellant and provides an insignificant contribution to the gas produced by the generator yet causes a pronounced change in the surface of the propellant charge as a function of the propellant temperature.

It is believed that the invention will be better understood from the following detailed description in which.

Figure 5A:
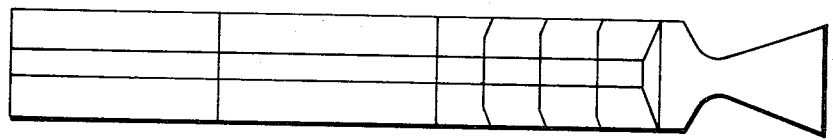
Figure 5B:
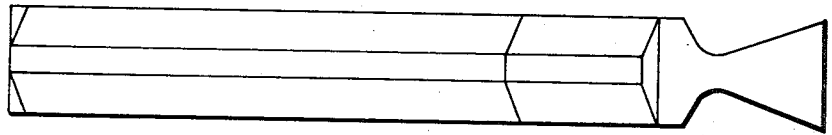
Figure 5C:
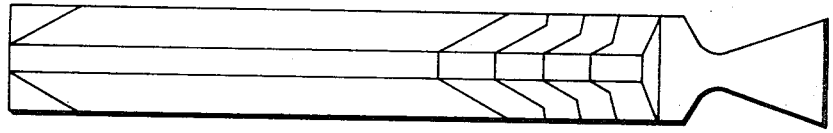

FIGS. 5a, 5b, and 5c are diagrams of the burning surface stability of a coned charge of this invention at three different charge temperatures.

Figure 1:
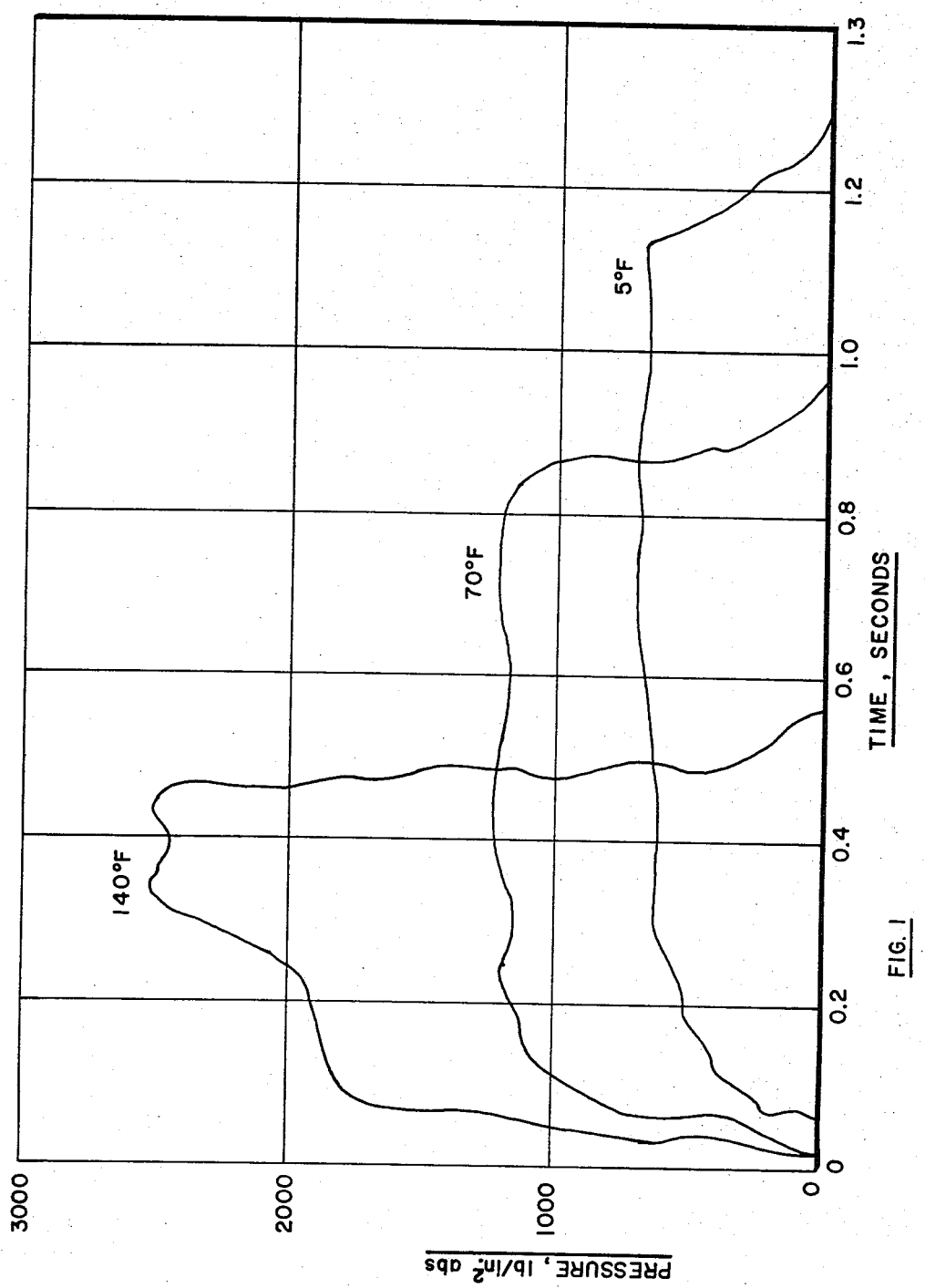
FIG. 1 is a plot of the variation of chamber pressure with time for a nine-pound cruciform grain at varying initial charge temperature.

As can be seen from FIG. 1 which is a diagram of the variation of the chamber pressure with time for a nine-pound cruciform, semi-restricted burning, plastic grain for 3.25-inch rocket motor, the propellant charge temperature has a marked affect on the performance of the generator. As is readily apparent from the diagram, the higher the charge temperature, the shorter the burning duration and higher the chamber pressure of the generator. Generally, it is desirable to have the generator performance at ambient or approximately 70 ° F conditions and it is the object of this invention to be able to pre-program propellant charges so that the pressure-time curve approaches that of ambient conditions or any particular conditions desired. It should be pointed out that the invention also has peculiar applicability to rocket missiles carried by aircraft at high altitudes and low temperatures. As can be appreciated, there will be a marked affect on such a missile as it goes from one extreme temperature to another as it goes from air to ground.

Chamber pressure $P_c$ is usually defined by the formula:

$$\left(\frac{S\rho a}{A_t}\right)^{\frac{1}{1-n}}$$

Wherein S equals the burning surface area of the grain in ft$^2$, $\rho$ is the density of the grain in lbs/ft$^3$, $a$ equals a ballistic content for initial grain temperature which varies between 0.002 and 0.05, $A_t$ is the throat area of the nozzle used on the rocket chamber in ft$^2$, and $n$ is a ballistic constant which is between 0.0 and 0.90.

In the above formula, the ballistic constants a and n are varied depending upon the given propellant composition and are not set factors. As can readily be seen from the above equation, an increase in the burning surface area of the propellant grain will effectively increase the chamber pressure of the generator. Thus, by so-increasing the burning surface one may raise the 5°-curve as shown in FIG. 1 to a chamber pressure level as shown on the 70°-curve line by design. Alternatively, by decreasing the burning surface the 150°-curve may be brought down to correspond to the ambient 70°-curve shown in FIG 1. Previous to this invention one method of changing a chamber pressure and thus affecting the burning rate of the propellant was to alter the size of the nozzle used to correspond to different temperatures of propellant. As can be seen from the formula given, the throat area of the nozzle also has a direct affect on the chamber pressure.

Figure 2:
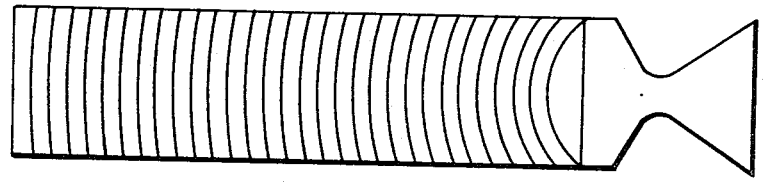
FIGS. 2 and 3 are burning surface stability diagrams for two different configurations of end-burning grains.
Figure 3:
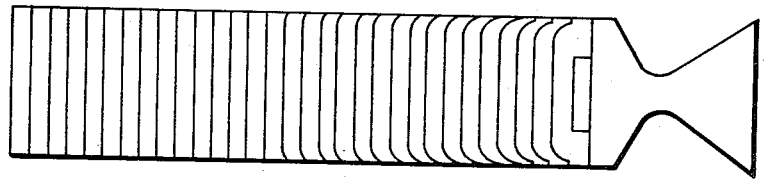

It is well established that in solid propellant burning the surface burned moves in the direction normal to itself at a uniform rate at every point and burns in a radius about a given point. If there is an irregularity in the surface of the grain, by simple geometric considerations assuming burning in all directions, the surface will smooth out and continue its regular recession as long as the desired surface is flat. As seen in FIG. 2, a cup-shaped initially-surfaced grain will eventually straighten out and the surface area be effectively reduced. This same phenomenon can be seen as illustrated in FIG. 3 where a slot is made at the end of the grain to effectively increase the burning surface thereof. This particular slot will eventually disappear as well. FIGS. 2 and 3 were obtained from page 83 of *Solid Propellant Rockets* by Clayton Huggett et al., published by Princeton University Press (1960). The same effect would be applied if one were to initially shape the surface of the grain in a conical configuration.

Figure 4:
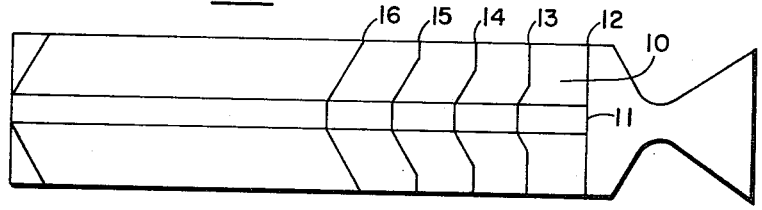
FIG. 4 is a diagram of a grain of this invention with a straight charge.

By placing a center strand of propellant in the gas generator having a different burning rate of that of the main charge, it has been found that the temperature sensitivity of the rocket motor can be greatly decreased. More particularly, the center strand should be less sensitive to temperature. For example, as seen in FIG. 4, a flat and burning grain 10 having a center strand 11 less temperature sensitive propellant situated therein. It obtains a larger burning surface as the grain is burned since the control strand burns at a faster rate than that of the main charge or propellant and creates, as can be seen, a conical-shaped surface. This condition occurs when the grain is at a low temperature and the center strand burns relatively faster. At station 12 in FIG. 4 both the main charge and control strand are in the same perpendicular plane at the end of the generator. At station 13 the less temperature sensitive control strand 11 has burned at a relatively faster rate than the main charge 10 since the low temperature has not retarded the burning rate of the less temperature sensitive control strand as compared to the more sensitive main charge. At stations 14 and 15, a more conical end surface is appearing due the previously discussed phenomena of the control strand burning faster than the main charge. Finally, at station 16, a completely conical end surface is obtained given a much larger surface area and thus higher chamber pressure with a resulting increase in the overall burning rate of the whole propellant charge. Obviously, equilibrium conditions are reached wherein a given conical configuration will be maintained where the main charge and control strand will be burning at a relatively same proportional rate. If desired, the equilibrium cone angle can be determined and the charge can be pre-coned to this angle so that the same surface area can be maintained throughout.

FIGS. 5a, 5b, and 5c represent the same initial conical-shaped grain which was burned at three different temperatures. In FIG. 5a the initial temperature was 95°. As can be seen, the burning surface of the grain gradually decreased. In FIG. 5b the initial temperature was 40° F and the surface area of the grain remained approximately constant as designed, thus the chamber pressure remained fairly constant. In FIG. 5c the initial temperature at which the grain was stored was −5° F and the surface area of the main charge significantly increased as burning transpired. In the three configurations shown in FIGS. 4, 5 and 6 the chamber pressure remained fairly constant at 400 psi.

Solid propellant temperature sensitivity is defined by the symbol $\pi_K$ which is the temperature sensitivity of equilibrium temperature at a particular value of K, where K is the ratio of the burning surface to the throat area of the generator. $\pi_K$ is normally expressed in percent/° F. The lower the value of $\pi_K$ for a given propellant, the less its sensitivity to changes in temperature. Thus, in this invention a less temperature sensitive propellant control center strand is used. That is, the center strand has a lower $\pi_K$ value than the main gas generator charge. As can be seen in FIG. 5a where the control strand is less sensitive to changes in temperature, it will not burn relatively as fast as the outer charge and thus the conical shape will eventually disappear as shown. In FIG. 5b where slightly less than ambient conditions are occurring, a conical shape is obtained rapidly and both the control strand and the main charge burn at the same rate maintaining the conical shape. In FIG. 5c the less-sensitive center strand will burn at a faster rate than the main charge at the −5° F temperature and thus the surface area of the grain is increased due to the effect of the center strand forcing the main charge into a conical burning shape. It has been discovered that through the use of the center control strand and the geometry of the burning resulting therefrom, that the effective $\pi_K$ of a motor will be that of the control propellant strand. Thus, it is desirable to use a generally temperature insensitive control strand.

As can readily be seen, the generator can be designed to operate at different conical angles depending upon the temperatures and propellants used. If a unit is designed to operate at a conical angle about midway between the design specification requirements for temperature range, the time required for unit to change from one conical surface to another will be minimized. For example, if a control angle of 45° is used at 70° F, this angle might presumably decrease to approximately something like 43° at a low temperature and increase to an angle something on the order of 47° at a high temperature.

EXAMPLE I

In order to demonstrate the invention, six end-burning propellant charges were tested at three different temperatures, two each at 40°, 125° and 200° F. The base propellant was comprised of:

| | Weight Percent |
|---|---|
| Butadiene/methylvinylpyridine 90/100 | 12.06 |
| Butyl carbitol formal | 2.72 |
| A mixture of N,N-diphenyl-para-phenylene-diamine and a complex diarylamine - butane reaction product (this additive is termed "Flexamine" and is made by United States Rubber Co., Naugatuck Chemical Division) | 0.37 |
| Ferric ammonium ferricyanide | 1.95 |
| Magnesium oxide | .49 |
| Ammonium nitrate | 80.00 |

The control strand was comprised of:

| | |
|---|---|
| Carboxy terminated linear polybutadiene (Butarez CTL made by Phillips Petroleum Co.) | 14.73 |
| Butyl carbitol formal | 2.94 |
| Methyl aziridinyl phosphine oxide | .33 |
| Ammonium perchlorate | 64.00 |
| Aluminum | 16.00 |
| Calcium oxalate | 2.00 |

The control strand was 0.25 inch in diameter while the base charge was 2.6 inches in diameter. The length of the base grain was 7.8 inches. The throat diameter of the nozzle was 0.115 inch in diameter. A pre-coned included angle of 60° was used for this particular combination of propellants based on ballistic calculations. The base propellant had a $\pi_K$ of 0.24; the control propellant had a $\pi_K$ of approximately 0.09. During the equilibrium portion of the traces obtained from the burning at the three temperatures, a $\pi_K$ value of 0.10 was obtained. This clearly indicated that the units functioned in accordance with the theory prescribed herein and that the effect of $\pi_K$ at equilibrium conditions became that of the control strand of propellant. As a result, it can readily be seen that the temperature sensitivity of a given propellant can effectively be reduced by the use of the control strands of less temperature sensitive propellant as set forth herein.

The concept set forth in this invention is not limited to the propellant compositions given in the example set forth. The problem that the invention solves arises when a given propellant is chosen for use because of its desired ballistic characteristics and such propellant has a relatively high temperature sensitivity. When this propellant is chosen, a control strand of a very temperature insensitive propellant can be concentrically inserted, making the total charge as temperature insensitive as the control strand. As previously pointed out, the control strand contributes virtually nothing to the ballistic characteristics to the charge since it is present in a relatively minute quantity. Thus, one is able to have a gas generator which is temperature insensitive yet possesses the desired ballistic characteristics. In other words, temperature insensitivity is no longer a major consideration when choosing a given propellant for a gas generator because of certain ballistic characteristics of the propellant.

From the previous results, it can be appreciated that the control strand of propellant having a lower temperature sensitivity effectively controls the burning rate and burning surface area of the base propellant charge used. At higher temperatures, the less-sensitive propellant will burn relatively slower than the faster-burning base charge and effectively retard and decrease the burning surface area so as to lower the chamber pressure to that obtained at designed ambient conditions. While alternatively, at lower temperatures the less-sensitive propellant strand will burn faster than the retarded base charge and force the base charge into a larger burning surface area thus increasing the chamber pressure to reach ambient condition.

The concept of this invention has applicability for virtually any type of solid propellant compositions, the main requirement being that a center control strand of temperature insensitive propellant be used. Thus, some of the types of propellants contemplated in the conventional double base propellants which are usually comprised of mixtures of nitrocellulose and nitroglycerin, solid propellants having ammonium nitrate or ammonium perchlorate as the oxidizer with a particulate metal fuel and a binder of polybutadiene-acrylic acid copolymer (PFBB) or other forms of butadiene-type or polyurethanes, polysulfides, polyvinylchloride-type binder materials. Thus, it can be seen that the propellant compositions per se are relevant to the invention only with regard to choosing one for its desired ballistic characteristics as the main propellant charge and choosing a control strand having a low $\pi_K$ value.

Since an infinite variety of solid propellants may be used, the invention not being limited to any one particular type, the relative diameters of the control strand and main charge can be selected depending on the chamber pressure and burning rates desired. If it is particularly desirous to pre-cone the propellant to the equilibrium cone angle, such can be done since the burning rates of propellants are known and the calculations can be made to determine the cone that will be achieved at the operating temperature for the gas generator. The diameter of the control strand is generally not critical and is usually kept at a minimum size so that the control strand is relatively insignificant to the exhaust gases from the generator.

Additionally, it should be pointed out that a group of propellants have been developed which are virtually temperature insensitive at given chamber pressure. These propellants are generally termed "Mesa" propellants. An example of such a propellant has the following composition:

| | Weight Percent |
|---|---|
| Nitrocellulose | 50.0 |
| Nitroglycerin | 34.9 |
| Diethylphthalate | 10.5 |
| 2-nitrodiphenylamine | 2.0 |
| Lead salicylate | 1.2 |
| Lead 2-ethylhexoate | 1.2 |

| | |
|---|---|
| Candelilla wax | .2 |

This propellant is virtually temperature insensitive at approximately 1,300 psi. Thus, if a gas generator was designed to operate at a chamber pressure of 1,300 psi and such a propellant were used as a control strand, the gas generator would be effectively temperature insensitive regardless of the temperature sensitivity of the main charge utilized.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A gas generator charge comprising:
   a first cylindrical solid propellant grain having disposed concentrically therein a second less temperature sensitive solid propellant strand, wherein said second propellant strand is smaller than said first grain so as not to materially contribute to the gas production of the propellant as a whole.

* * * * *